US010112116B2

(12) United States Patent
Zhang

(10) Patent No.: US 10,112,116 B2
(45) Date of Patent: *Oct. 30, 2018

(54) METHOD AND SYSTEM FOR DATA COLLECTION USING LARGE-SCALE INTERACTIVE USER RESPONSE

(71) Applicant: Disney Enterprises, Inc., Burbank, CA (US)

(72) Inventor: Yuecheng Zhang, Burbank, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/362,549

(22) Filed: Nov. 28, 2016

(65) Prior Publication Data

US 2017/0072325 A1  Mar. 16, 2017

Related U.S. Application Data

(63) Continuation of application No. 14/204,369, filed on Mar. 11, 2014, now Pat. No. 9,504,908.

(51) Int. Cl.
*A63F 9/24* (2006.01)
*A63F 13/86* (2014.01)
*A63F 13/00* (2014.01)

(52) U.S. Cl.
CPC .............. *A63F 13/86* (2014.09); *A63F 13/00* (2013.01)

(58) Field of Classification Search
CPC .......... A63F 13/00; A63F 13/12; A63F 13/50; A63F 13/86
See application file for complete search history.

(56) References Cited

U.S. PATENT DOCUMENTS

| | | | | |
|---|---|---|---|---|
| 5,221,094 A * | 6/1993 | Hanson | ..................... | A63F 9/18 273/431 |
| 5,288,075 A * | 2/1994 | Kelley | ................ | A63F 3/00006 273/243 |
| 5,697,844 A * | 12/1997 | Von Kohorn | ........... | A63F 13/12 348/E7.024 |
| 6,343,990 B1 * | 2/2002 | Rasmussen | ............ | G06Q 30/02 463/25 |
| 6,935,945 B2 * | 8/2005 | Orak | ....................... | A63F 13/12 463/42 |
| 2005/0107162 A1 * | 5/2005 | Kilby | ...................... | G07F 17/32 463/42 |
| 2005/0144633 A1 * | 6/2005 | Babayan | ............ | H04N 21/4758 725/24 |
| 2012/0284090 A1 * | 11/2012 | Marins | ............... | G06Q 10/0631 705/7.39 |
| 2014/0095460 A1 * | 4/2014 | Romanowski | ....... | G06Q 10/101 707/705 |

* cited by examiner

*Primary Examiner* — Steve Rowland
(74) *Attorney, Agent, or Firm* — Fay Kaplun & Marcin, LLP

(57) ABSTRACT

A method including receiving a broadcast of an event comprising a plurality of frames; receiving, from a plurality of users, a corresponding plurality of inputs, each of the inputs relating to a characteristic of an object depicted in one of the frames of the broadcast; and analyzing the plurality of inputs to determine a best guess of the characteristic of the object in the frame.

19 Claims, 2 Drawing Sheets

METHOD AND SYSTEM FOR DATA COLLECTION USING LARGE-SCALE INTERACTIVE USER RESPONSE

BACKGROUND

Viewers of sporting events increasingly wish to view events accompanied by event data. Some types of event data may feasibly be collected automatically, but other types of data require manual input. Manual input of event data by professional operators can be labor-intensive and time-consuming.

DETAILED DESCRIPTION

Figure 1:
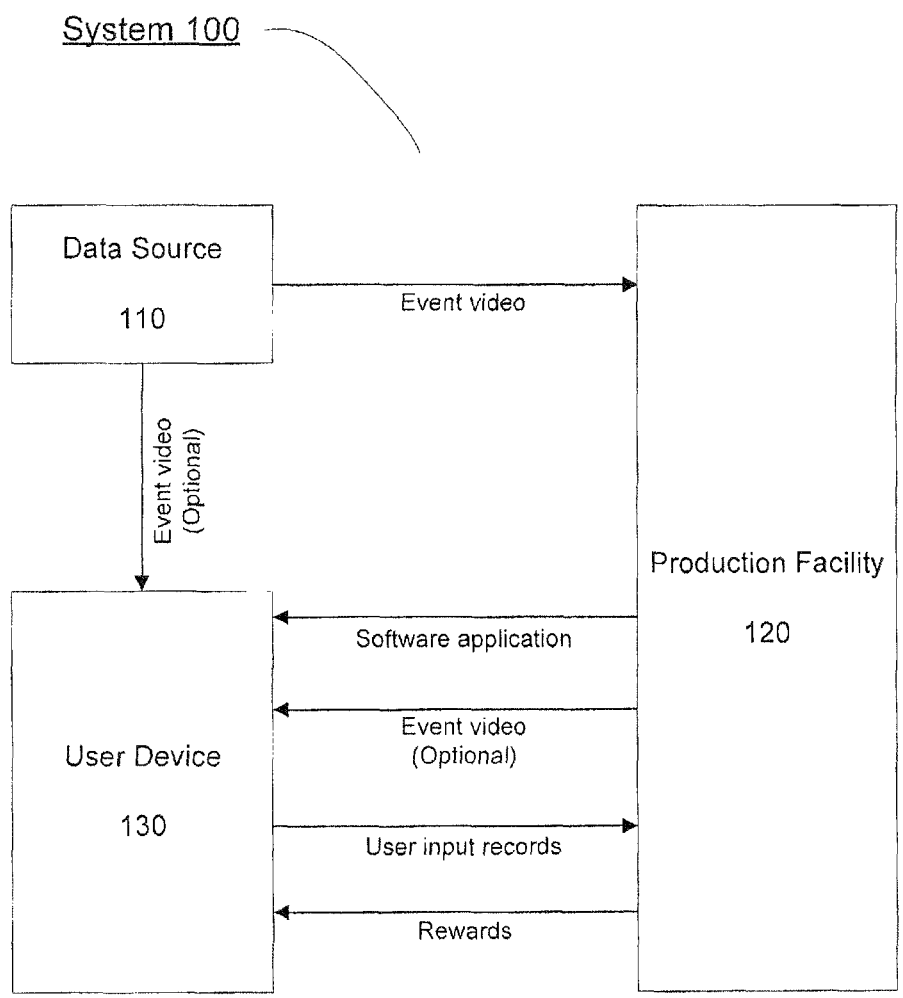
FIG. 1 shows a schematic view of a system for data collection according to an exemplary embodiment.

The exemplary embodiments may be further understood with reference to the following description and the related appended drawings, wherein like elements are provided with the same reference numerals. Specifically, the exemplary embodiments relate to methods and systems for using large-scale interactive user input to collect data about sporting events.

Viewers of broadcasts of sporting events often wish to have the broadcasts accompanied by enhanced displays of data. Data provided to the viewers may range from simple, such as a game score, count of balls and strikes, or time remaining, to complex, such as pitch location, player location, etc. Improvements in measurement technology have made it possible to reliably automatically collect some types of data, such as the speed or location of a tennis ball. However, existing technology is not capable of automatically collecting other types of data, such as player locations, location or timing of special events (e.g., goals, shots, touchdowns, strikes, etc.), changes in formation or strategy, performance or behavior of individual players, etc., in order to provide them to viewers in real time.

Prior techniques for gathering this data have involved collection of manual input by experienced operators to record these other types of data such as player positions. However, while this may provide accurate information, it is a labor-intensive and non-trivial task that may require days of work to process a single game. Automatic or semiautomatic data collection systems with the help of experienced operators may improve the operation time, but the results may drop below acceptable accuracy levels; refining this data to reach an acceptable level may take a significant amount of time. Therefore, there is a need for a solution that generates acceptable results in a reasonable amount of time.

The exemplary embodiments use crowdsourcing to obtain user input from a large number (e.g., in the hundreds or more) of viewers of a sporting event. The user input may be, for example, an identification of a position in a video frame for a selected player, and user input received from multiple users may be analyzed to determine the player's position in three-dimensional space. The exemplary embodiments may solicit user input by offering a reward (e.g., a monetary payout) for the prompt submission of accurate input. The requests for user input and subsequent rewards may be presented to users as an interactive game in which the users are participating. It will be apparent to those of skill in the art that, although the exemplary embodiments are described with specific reference to a system for obtaining player locations, the broader principles embodied therein are equally applicable to a system for obtaining other types of data, as described above.

FIG. 1 schematically illustrates a system 100 for collecting and analyzing crowd sourced data according to an exemplary embodiment. It will be apparent to those of skill in the art that, while the system 100 will be described with specific reference to a solution for collecting data relating to player positions during a sporting event, the broader principles exemplified therein may be equally applicable to a system for collection and analysis of any other type of data. The system 100 includes a data source 110 providing the source data from which further data is to be extracted. In the exemplary embodiment, the data source 110 is a video capture array (e.g., one or more video cameras) at the site of a sporting event. It will be apparent to those of skill in the art that the data source 110 may collect other data (e.g., audio data) in addition to the data to video data to be discussed hereinafter.

For each of the one or more cameras that comprise data source 110, a camera model may be known. Based on this camera model, two-dimensional data relating to an image taken by the camera may be converted to three-dimensional data relating to an object in the field of view of the camera and shown in the image. Such a camera model may be determined using known techniques based on, for example, the camera position, the angle of the camera, the dimensions of the playing field being captured by the camera, etc.

The system 100 also includes a production facility 120. The production facility 120 may be, for example, a facility maintained by an event broadcaster that also operates data source 110, and may be a facility that produces finalized broadcasts based on raw data collected at the data source 110. The production facility 120 may be centralized or may be a remote facility.

The system 100 also includes a user device 130. The user device 130 may be any type of device capable of displaying video data to the user and receiving subsequent input from the user. In one embodiment, the user device 130 may be a tablet device or other mobile device with a touch screen. In another embodiment, the user device 130 may be a wearable device, such as smart glasses. In some embodiments, the user device 130 may encompass a plurality of devices in association with one another, such as a television or other display displaying video to the user and a tablet or other handheld device for receiving user input. Video displayed by the user device 130 may be received directly from the data source 110 or via the production facility 120. The user device 130 may also send user input to the production facility in accordance with the method 200 that will be described hereinafter. The user device 130 may receive video data and send user input over any appropriate communication channel, such as a cable or satellite television connection, an IP data connection, etc. Those skilled in the art will understand that there may be hundred, thousand or millions of user devices 130 that are receiving any particular broadcast and that this description is describing the operation of one of these user devices, but the production facility 120 may, in fact, be interacting with all the user devices 130 that are tuned to a particular broadcast and the users have opted to provide information for the broadcast.

Figure 2:
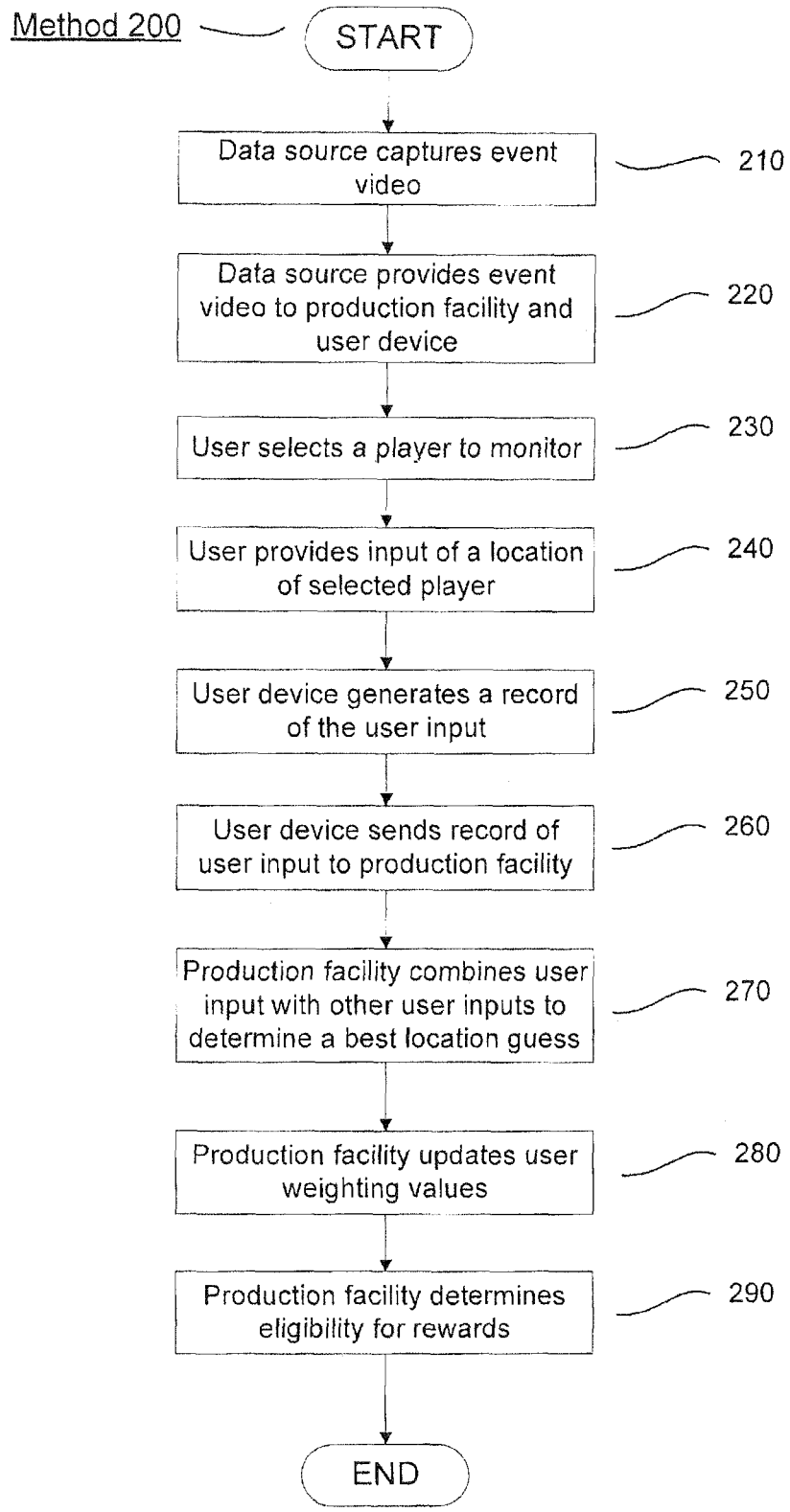
FIG. 2 shows an exemplary method for data collection to be performed by a system such as the exemplary system of FIG. 1.

FIG. 2 illustrates an exemplary method 200 for collecting data using interactive user responses. The method 200 will be described with reference to the elements of the exemplary system 100 of FIG. 1, but those of skill in the art will understand that the broader concepts of method 200 may alternately be performed by other arrangements of hardware. Further, though the exemplary method 200 will be described specifically with reference to collecting user responses relating to the position of players in a sporting event and using such information to derive a best estimate of the players' actual positions, the broader principles are equally applicable to any other type of input that may be made by a viewer and subsequently synthesized with the input of other viewers. It will be assumed that, prior to the performance of method 200, the user device 130 has already been provided with any software or configuration required to perform the tasks that will be described below.

In step 210, the data source 110 captures video of an event. As noted above, this may involve video capture from one or more cameras having various perspectives of the event. In some embodiments, the video that is output by the data source 110 may be edited so that it changes among different cameras capturing the event depending on which camera provides the best view of the event or on other factors, such as following notable players. Video captured may be in any format, any aspect ratio, any frame rate, etc., without departing from the general concepts described herein.

In step 220, the video captured by the data source 110 is provided to the production facility 120 and the user device 130. As noted above, video may be provided to the user device via the production facility 120 (e.g., after the addition of enhancements such as graphics) or directly from the data source 110. Provision of the video may be via any appropriate type of channel, such as a satellite connection, a cable television connection, an IP data connection, etc.

In step 230, a user of the user device 130 selects a player to monitor and for whom input will be provided by the user. This may be accomplished using a user interface provided on the user device 130. The user may be provided with the option to return to this step and select a different player during the course of the event. In one embodiment, the user may be prompted to select a particular player (e.g., a player that few other users have selected), such as by preventing the user from selecting other players or by providing the user with an incentive (e.g., an enhanced reward) to select the desired player. In another embodiment, a player may be assigned to a user based on need (e.g., a player that few other users have selected) rather than giving the user an option to select a player.

Steps 240-260, described below, relate to the process by which a single item of user input is generated by a user of user device 130 and provided to production facility 120 (e.g., as noted above, a facility operated, by a broadcaster of the event) for subsequent processing in conjunction with input from other users. Steps 270 and 280 relate to the process by which the user input is acted upon at the production facility 120 to generate final results (e.g., in the exemplary embodiment, a best estimate for the position of the player whom the user has selected in step 230). It will be apparent to those of skill in the art that the user of user device 130 may provide multiple input items through the repetition of steps 240-260 during one time interval (e.g., in real time during a live event broadcast, a time frame approximating real time, or during another time frame selected by the user), and that the analysis of those input items in steps 270 and 280 may be performed during some other time interval (e.g., after the event broadcast, during the preparation of a highlights package, during the preparation of an enhanced rebroadcast, etc.). However, for clarity, the exemplary method will be described sequentially herein as illustrated in FIG. 2.

In step 240, the user of user device 130 provides a location of the player selected in step 230. The location may be provided by a physical input by the user that is appropriate to the nature of the user device 130. For example, where the user device 130 is a tablet device, the location may be input by tapping a touch screen at the desired location, which may be interpreted to be x and y coordinates of the selected player in the display. In another embodiment, the user may trace a path on a touch screen following the path of the selected player. In such an embodiment, the user device 130 may convert the path into a plurality of discrete inputs, such as by recording a location along the path as an input at periodic time intervals, such as one per second; these time intervals may be preconfigured or user-configurable, such as based on the input or transmission capabilities of the user device 130. Where the user device 130 is a smart glasses device or other wearable device, the location may be input by aligning the player with a graphical representation of the player or by aligning a lens center with the player; in such an embodiment, knowledge of the user's location, pose, etc., determined by sensors in the device or other appropriate methods or devices, may enable such an input to provide a location (e.g., x and y coordinates) of the player in the display image. Where the user device 130 is a desktop, notebook, or other conventional type of computing device, the location may be input by placing a cursor at the desired location and making an input (e.g., clicking a mouse or touchpad button).

In step 250, the user device 130 generates a record of the user's input. The record may include various individual data items. In the exemplary embodiment, the record may include the x and y coordinates of the input made by the user as recorded by the user device 130. The record may also include a user identifier for the user (e.g., a user login ID, an account number, an IP address, or any other appropriate identifier). The record may also include a message time code; the value used for the message time code may vary in different implementations, depending on factors such as processing or transmission delay, and may be, for example, a frame identifier from the input video or a global time value. The record may also include a frame identifier enabling the production facility 120 to determine the precise point in the video for which the input was made. This may encompass an identification of both the video (e.g., a unique identifier of the event being broadcast) and the frame (e.g., the specific point in time the input was made), which may be identified using the time code from the generating device. The record may also include an identification of the player for whom the input was made (e.g., using one of a plurality of unique player identifiers defined by a broadcaster of the event to designate each of the players involved in the event).

In some embodiments, the record may also include a blob identifier. As used herein, a "blob" may be defined as a as a group of pixels (or other discrete areas) in an image that are assigned to a single identifiable visible unit; typically, a blob may be a single player or a group of players in close proximity to one another who are not visibly separable. Images may be processed for blob identification either before they are provided to users or after input has been received from users to identify various blobs contained therein. A user input made anywhere within the region designated as a given blob will be labeled with a corresponding blob identifier, and all inputs within the blob may be deemed to have the same location; the purpose of this convention is to improve the quality of user input from devices with limited input accuracy, such as mobile phones. Any inputs received that have (x, y) coordinates within the area of a given blob (and, thus, with a given blob identifier) will be deemed to be equivalent to one another and will have their coordinates updated to a value (x', y') representing the blob collectively. The collective value (x', y') may be determined algorithmically, and may, for example, simply be located at the geometric center of the blob. In another embodiment, the value (x', y') may be placed at a point that coincides with a player's feet (e.g., at the bottom of a bounding box defining the blob), or at a point that coincides with a player's head (e.g., at the top of a bounding box defining the blob).

Each of the specific elements of the record may be used by the production facility as will be described hereinafter. It will be apparent to those of skill in the art that the specific elements of the record may vary among differing embodiments, particularly those relating to some type of data other than player position, which may include other elements not mentioned herein or may lack one or more of the elements described herein.

In step 260, the user device 130 sends the record of the user's input, generated in step 250, to the production facility 120. This transmission may be accomplished by any appropriate means for such transmission, including but not limited to transmission via an IP network. As noted above, steps 240-260 may be repeated for each user input, while the subsequent steps may be performed at a later point in time. As an alternative, steps 240 and 250 may be repeated for each user input, while step 260 may be performed once (e.g., after the user stops viewing the broadcast) with the transmission including all records generated through the repeated performance of steps 240 and 250.

As described above, steps 240-260 relate to the process by which an item of user input is captured at the user device 130 and transmitted. Steps 270 and 280 occur after the user input has been transmitted to the production facility 120, and relate to the process by which the user input is processed. As noted above, while FIG. 2 illustrates a method whereby step 270 follows in sequence directly after step 260, a number of user input items may be generated by a single user and provided one at a time or in bulk, and the processing at the production facility 120 may be delayed until another point in time, such as after a sufficient amount of input from various users has been received for a given event. The processing may be triggered manually, such as by an operator monitoring the receipt of user input, or automatically, such as once the production facility 120 determines that a sufficient amount of input has been received for a given player-frame pair, a given frame, a given event broadcast, etc.

In step 270, the production facility combines the user input from steps 240-260 with similar input received from other users to generate output. It will be apparent to those of skill in the art that a given input sample relating to a position of a given athlete at a given point in time (with the point in time represented by the specific frame of video) will be evaluated in conjunction with other samples relating to the same athlete and point in time, and not, for example, samples related to other athletes. It will be further apparent to those of skill in the art that the (X, Y) coordinates of inputs received from different users may be with respect to different scales depending on the format of the displays being used by the various users; therefore, prior to evaluating the inputs in conjunction with one another, the inputs may be normalized so that they are all scaled to a standardized format (e.g., 1920 pixels by 1080 pixels).

A specific evaluation technique is disclosed hereinafter, but those of skill in the art will understand that other techniques may be possible without departing from the broader principles outlined herein. Generally speaking, the exemplary evaluation technique may be understood as an iterative technique whereby position inputs are weighted according to past accuracy of the user who made the input, and are then used in an iterative technique to converge on a best guess for the player's position in the frame under consideration.

The production facility 120 may include a database storing an accuracy value $P_i$ for each of a plurality of users i, including the user who generated the input discussed above in steps 240-260. The accuracy value $P_i$ for each user may be based on the accuracy of prior inputs received from the user, such as for previous games, and may take any format, such as an integer value, a decimal value, or any other type of value desired by an operator of the production facility 120. For the frame j under consideration, a plurality of inputs are received at the production facility 120; the quantity of inputs is designated as $K_0$. The input from each user i may take the form $(X_i, Y_1)$ corresponding to the point in the two-dimensional view displayed to each user that the user indicated as the position of the selected player. An initial guess for the position (X, Y) of the player, based on the $K_0$ inputs, may be that the position of the player is:

$$\frac{\sum_{i=1}^{K_0} P_i X_i}{\sum_{i=1}^{K_0} P_i}, \frac{\sum_{i=1}^{K_0} P_i Y_i}{\sum_{i=1}^{K_0} P_i}$$

Once the initial guess has been determined, one or more inputs that are too far from the initial guess are eliminated from consideration. Distance from a given input $(X_i, Y_i)$ to the guess (X, Y) may be determined by a linear distance, by a sum of the horizontal and vertical distances $(X_i-X)+(Y_i-Y)$, or in any other appropriate manner. The inputs that are eliminated may or may not include the input discussed above with reference to steps 240-260. In one embodiment, a single input that is furthest away from the guess may be eliminated. In another embodiment, two or more inputs that are furthest away may be eliminated. In another embodiment, all inputs greater than a threshold distance away from the guess may be eliminated; such a threshold may be predetermined or user-determined, and may, in one embodiment, grow gradually smaller as more guesses have been made. It will be apparent to those of skill in the art that which and how many inputs to eliminate at this, or any, stage of the process may vary among differing embodiments, and that this determination may be made in any number of manners.

Once one or more guesses have been eliminated, the previously-existing $K_0$ inputs will be reduced to a smaller quantity $K_1$. The same calculation described above may be repeated to yield a second guess for the position (X, Y) of the player that may be expressed as:

$$\frac{\sum_{i=1}^{K_1} P_i X_i}{\sum_{i=1}^{K_1} P_i}, \frac{\sum_{i=1}^{K_1} P_i Y_i}{\sum_{i=1}^{K_1} P_i}$$

The steps of eliminating one or more inputs from consideration to yield a reduced set of inputs, and recalculating the guess based on the reduced set of inputs, may be repeated until a final result is reached. This may involve performing a predetermined number of iterations (e.g., until a guess has been determined based on a set of $K_5$ inputs), until a predetermined number of inputs remain, or until a convergence point is reached. In one exemplary embodiment, a convergence point may be defined as the point where:

$$P_{i,k} = \begin{cases} 1 & \text{if } \sqrt{(X_i - \overline{X_k})^2 + (Y_i - \overline{Y_k})^2} < D_k \\ 0 & \text{otherwise} \end{cases}$$

$$\overline{X_{k+1}} = \frac{\sum_{i=1}^{N} X_i \times P_{i,k}}{\sum_{i=1}^{N} P_{i,k}}$$

$$\overline{Y_{k+1}} = \frac{\sum_{i=1}^{N} Y_i \times P_{i,k}}{\sum_{i=1}^{N} P_{i,k}}$$

$$\text{stop when } \begin{cases} \overline{X_{k+1}} = \overline{X_k} \\ \overline{Y_{k+1}} = \overline{Y_k} \end{cases}$$

The converged value, or other final result, is then used as the optimal guess for the position of the selected player in the frame at hand. It will be apparent to those of skill in the art that, once the position has been determined in this manner, it can then be used for any number of purposes, such as for generating enhanced graphics or for player tracking. The position may be converted from two-dimensional coordinates as shown on the screen to corresponding three-dimensional coordinates using a camera model based on known techniques, or may be used in the two-dimensional version (e.g., for generating features to be inserted into the two two-dimensional display). The result may be used in conjunction with results for the same player for other frames to determine further data about the player, in conjunction with results for other players for the same or other frames to determine further data about the game as a whole, or on its own to provide data about the single frame for which the result was determined. The subsequent use of the result is beyond the scope of the exemplary embodiments and will not be discussed further.

In step 280, the $P_i$ values used for weighting various user inputs in step 270 are updated based on the accuracy of the various user inputs that were evaluated in step 270. This may involve improving a user's $P_i$ value for a high-quality input (e.g., an input located close to the final result of step 270), degrading a user's $P_i$ value for a low-quality input (e.g., an input located far from the final result of step 270), or leaving a user's $P_i$ value changed for a medium-quality input (e.g., an input located an intermediate distance from the final result of step 270). For example, in an embodiment where the $P_i$ values are integers, the production facility 120 may add one to a user's $P_i$ value for an input within a small radius (e.g., 30 pixels) of the final result, may leave the user's $P_i$ value unchanged for an input within a large radius (e.g., 60 pixels) of the final result but not within the small radius, and subtract one from the user's $P_i$ value for an input not within the large radius. Thus, it will be apparent that the $P_i$ values as used in the weighting described above may give more weight to the inputs of users that have historically provided useful data than to the inputs of users that have not done so. It will be further apparent to those of skill in the art that the specific $P_i$ value type (e.g., integer values) and adjustments described above are only exemplary and that other schemes of $P_i$ values that provide adjustable weighting as described above are also possible without departing from the broader principles outlined herein.

In step 290, the production facility 120 determines whether the user of user device 130 who made the input described above with reference to steps 240-260 is entitled to a reward due to the input. As described above, the exemplary embodiments may provide users with a reward in exchange for high-quality input in order to encourage large numbers of users to make such input. It may further be a goal of the exemplary embodiments to encourage the users to provide such input in a rapid manner (e.g., as soon as possible after a live broadcast of the event). Thus, the exemplary embodiments may consider a combination of the accuracy and the timeliness of the user input to determine one or more users to receive a reward. In one exemplary embodiment, a reward may be given to a predetermined number of users (e.g., ten users) who are the first to provide a high-quality (e.g., within 30 pixels of a final result) input for a given player and frame. Those of skill in the art will understand that the precise criteria used may vary among differing embodiments; however, reward criteria recognizing solely speed of response without regard to accuracy may be undesirable because users may opt to provide rapid random inputs in order to qualify for a reward.

The specific reward provided to qualifying users may also vary among differing embodiments. In one exemplary embodiment, users who are entitled to a reward may simply receive a cash payment (e.g., one cent, one hundredth of one cent, etc.). Cash payments provided as rewards in this manner may be aggregated and paid to users after completion of one event broadcast, a predetermined number of event broadcasts, at the end of each month, or at any other appropriate interval. Payment may be made by electronic funds transfer or any other appropriate method of transfer. Alternately, the reward may take the form of a merchandise credit redeemable for a discount on purchases made from a broadcaster, or of a period of enhanced services provided by the broadcaster. It will be apparent to those of skill in the art that the specific nature and value of the reward may vary without departing from the broader principles of the exemplary embodiments.

Following the determination of rewards in step 290, the method 200 terminates. However, as noted above, it will be apparent to those of skill in the art that the method 200 may not proceed in a strictly linear manner, and that the user of the user device 130 may continue to provide further inputs for further frames even after the rewards for prior frames have already been determined.

The exemplary embodiments may enable a provider of video programming, such as sporting events, to employ crowdsourcing of input to generate data about such events in a more achievable and efficient manner than possible using prior techniques. In contrast to employing a professional operator to track more than one player at the same time, tracking is divided into achievable tasks such as tracking a single player every few seconds; with many viewers sharing the divided tracking, each player may still be tracked by multiple fans in every frame, yielding high-quality results in a timely manner.

Additionally, providing the request for input to viewers as a game may boost user engagement. Because a viewer may earn rewards by providing reliable input in a timely manner, viewer engagement may be improved. Although the total cost may be non-trivial (for example, if a reward is 0.01 cents per qualifying input, the total payout may be several thousand dollars per event), it may also be worthwhile due to the generation of valuable event data and viewer attraction.

Further, the data generated by the crowdsourcing system of the exemplary embodiment may be used to improve automatic data-gathering systems. For example, the data gathered by the exemplary embodiments may be used as a point of comparison against which an automated data-gathering system operated by the event broadcaster may be judged. Further, if the broadcaster does not wish to develop its own in-house data-gathering system, a third-party wishing to develop a data-gathering system may use such a system to provide input to the crowdsourcing system as a way to generate revenue using the data-gathering system. If such a third-party data-gathering system becomes sufficiently efficient, the broadcaster may even collaborate with the owner of the third-party data-gathering system.

Those of skill in the art will understand that the above-described exemplary embodiments may be implemented in any number of matters, including as a software module, as a combination of hardware and software, etc. For example, the exemplary method 200 may be embodied in a program stored in a non-transitory storage medium and containing lines of code that, when compiled, may be executed by a processor.

It will be apparent to those skilled in the art that various modifications may be made to the exemplary embodiments, without departing from the spirit or the scope of the invention. Thus, it is intended that the present invention cover modifications and variations of this invention provided they come within the scope of the appended claims and their equivalents.

What is claimed is:

1. A method, comprising:
    receiving, by a processor, a software application for sports player data collection,
    receiving, by the processor, user input from a user, wherein the user input relates to a characteristic of a player depicted in a sports broadcast, and
    sending, by the processor, the user input to an analysis apparatus,
        wherein the analysis apparatus analyzes the user input in combination with a plurality of other user inputs to determine a best guess of the characteristic of the player in a frame, and
        wherein the analyzing comprises determining a weighted average of the plurality of inputs.

2. The method of claim 1, wherein the characteristic is a location of the player, wherein the location of the of the player is input with user taps on a touch screen at particular x and y coordinates, and wherein the particular x and y coordinates are based on the location of the player.

3. The method of claim 2, wherein the location of the player is confined by a boundary area of the sport.

4. The method of claim 1, further comprising:
    receiving, by the processor, video of the sports broadcast directly from a data source located at a live sporting event.

5. The method of claim 1, further comprising:
    receiving, by the processor, video of the sports broadcast directly from a production facility, wherein the production facility receives video of the sports broadcast directly from a data source located at a live sporting event.

6. The method of claim 1, further comprising:
    displaying video of the sports broadcast on a touch screen.

7. The method of claim 1, wherein the user input includes a selection of the object to monitor, wherein a user incentive to select a particular player depends on a number of other users that have selected the particular player.

8. The method of claim 1, further comprising:
    generating a record of the user input, wherein the record includes x and y coordinates of the location of the player, a frame identifier for a frame associated with each input coordinate, an identification of the player, and an identification of the user.

9. The method of claim 8, wherein the user input sent to the analysis apparatus includes the generated record of the user input.

10. The method of claim 1, further comprising:
    receiving, by the processor, a reward, wherein the reward is based on the user input sent to the analysis apparatus.

11. A system, comprising:
    a display device displaying a broadcast of a sports event;
    an input device receiving user input from a user, wherein the user input corresponds to a location related characteristic of a player depicted in the broadcast during a first time interval; and
    a processor executing a software application for sports player data collection, where the software application causes the processor to perform operations comprising:
        recording the user input, wherein the user input is based on the user touching a touch screen at particular x and y coordinates, and wherein the particular x and y coordinates are based on the location of the player depicted in the broadcast, and
        sending the recoded user input to an analysis apparatus.

12. The system of claim 11, wherein the location of the player is confined by a boundary area of the sport.

13. The system of claim 11, wherein a video capture apparatus and a broadcasting apparatus are located at a data source located at a live sporting event, and wherein the user device receives the video broadcast directly from the data source.

14. The system of claim 11, wherein a video capture apparatus and a broadcasting apparatus are located at a data source located at a live sporting event, wherein a production facility receives the video of the broadcast directly from the data source, and wherein the user device receives the video broadcast directly from the production facility.

15. The system of claim 11, wherein the display device and the input device are integrated into a touch screen.

16. The system of claim 11, wherein the user input includes a selection of the player to monitor, wherein a user incentive to select a particular player depends on a number of other users that have selected the particular player.

17. The system of claim 11, wherein the record of the user input includes the processor generating a record of the user input,
    wherein the record includes x and y coordinates of the location of the player, a frame identifier for a frame associated with each input coordinate, an identification of the player, and an identification of the user, and
    wherein the user input sent to the analysis apparatus includes the record of the user input.

18. The system of claim 11, wherein the processor receives a reward, wherein the reward is based on the user input sent to the analysis apparatus.

19. A non-transitory computer-readable storage medium storing a set of instructions that is executable by a processor, the set of instruction, when executed by the processor, causing the processor to perform operations comprising:

receiving a software application for sports player data collection, receiving user input from a user, wherein the user input corresponds to a location related characteristic of a player depicted in a sports broadcast during a first time interval and is based on the user touching a touch screen at particular x and y coordinates, and wherein the particular x and y coordinates are based on the location of the player depicted in the broadcast, and sending the user input to an analysis apparatus.

* * * * *

UNITED STATES PATENT AND TRADEMARK OFFICE
CERTIFICATE OF CORRECTION

PATENT NO. : 10,112,116 B2
APPLICATION NO. : 15/362549
DATED : October 30, 2018
INVENTOR(S) : Yuecheng Zhang Page 1 of 1

It is certified that error appears in the above-identified patent and that said Letters Patent is hereby corrected as shown below:

In the Claims

Column (9), Line (55):
"of the of the" should be "of the"

Signed and Sealed this
Twenty-first Day of April, 2020

Andrei Iancu
*Director of the United States Patent and Trademark Office*